Aug. 4, 1925.

R. L. HINMAN

MILKING MACHINE

Filed March 31, 1921   2 Sheets-Sheet 1

1,548,037

INVENTOR
R. L. Hinman
BY
Dinison Thompson
ATTORNEYS

Aug. 4, 1925.  1,548,037
R. L. HINMAN
MILKING MACHINE
Filed March 31, 1921   2 Sheets-Sheet 2
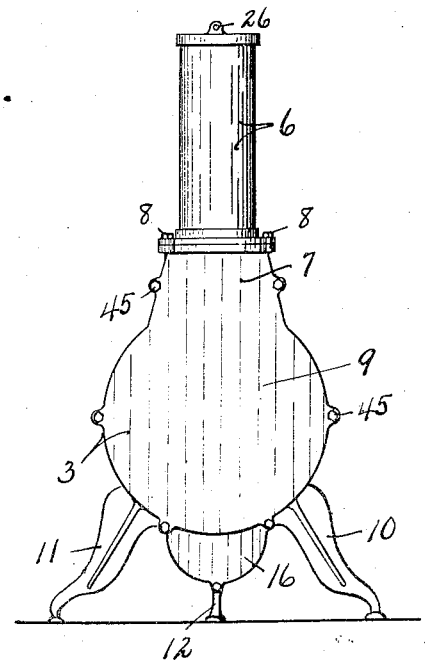
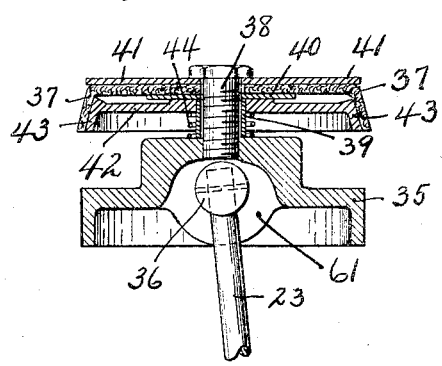
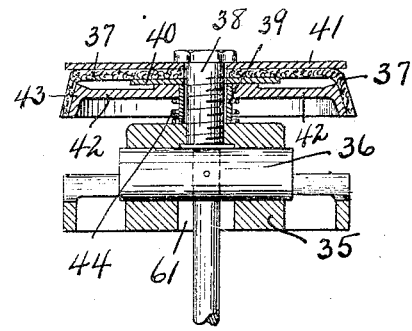

Patented Aug. 4, 1925.

1,548,037

UNITED STATES PATENT OFFICE.

RALPH L. HINMAN, OF ONEIDA, NEW YORK.

MILKING MACHINE.

Application filed March 31, 1921. Serial No. 457,201.

*To all whom it may concern:*

Be it known that I, RALPH L. HINMAN, of Oneida, in the county of Madison, in the State of New York, have invented new and useful Improvements in Milking Machines, of which the following, taken in connection with the accompanying drawings, is a full, clear, and exact description.

This invention relates to certain improvements in milking machines.

The primary object of the invention is the production of an efficient, portable milking machine, constituting in itself a complete milking unit. The machine is of a power-driven character utilizing motor means, preferably of an electrical nature.

The accomplishment of the said primary object in a preferred manner necessitates not only the production of a machine which shall be comparatively small, and of a weight capable of being easily transported by a single individual, but also the production of a machine of simple, and as far as may be, inexpensive construction, without in any way sacrificing the most efficient method of operation.

A machine of this character can be used in any desired place where proper electrical connections can be made, assuming that an electrically operated motor is applied, and avoids entirely the necessity of permanent installation of the machine in a stable, including the positioning of drive-rods and other movable or fixed parts upon or about the stanchion.

Another object relates to the provision of means for preventing milk from being drawn into the pump under conditions where the vacuum chamber fills or substantially fills.

Other objects and advantages relate to the details of construction, as for instance, the construction of the piston of the machine, all as will more fully appear from the following description taken in connection with the accompanying drawings in which:—

Figure 4 is an elevation of the gear casing and pump.

Figures 5 and 6 are sections through the piston, one being taken at right angles to the other.

Figure 1:
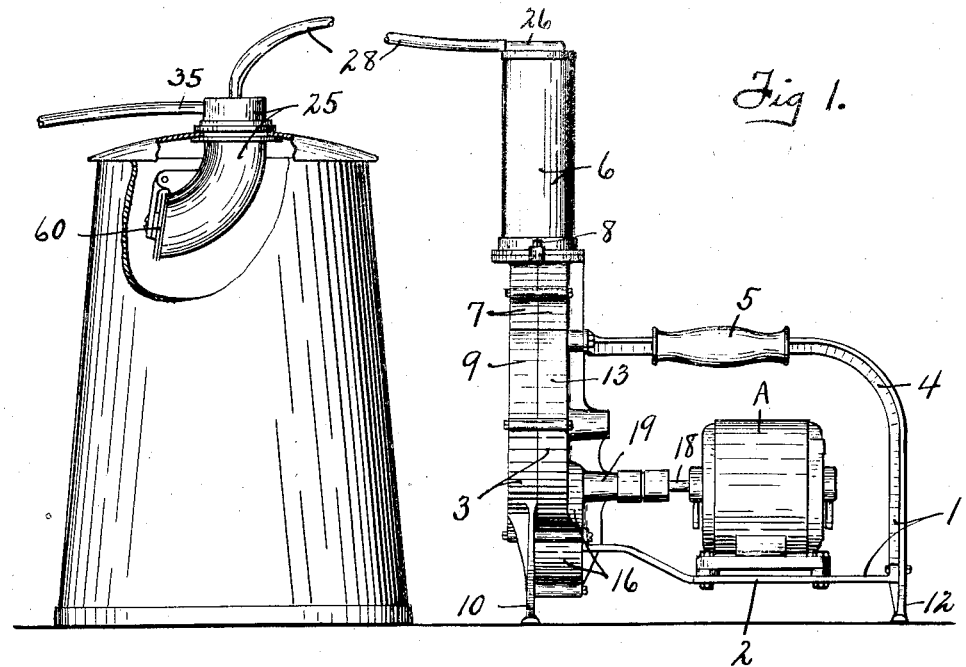
Figure 1 is an elevation of an apparatus of my invention.

The apparatus of this invention comprises a frame —1— consisting of a substantially horizontally arranged plate —2— having one end connected to a gear-casing or housing —3—, and its opposite end connected to the lower portion of an angle bar —4—, one end of which constitutes a portion of the supporting means for the apparatus, the other end of which is connected to the gear-casing —3—. The angle-bar —4—, as shown, is adapted to constitute a handle for carrying the apparatus, and for that purpose is provided with a suitable grip —5—, positioned so that the motor —A— will balance the gearing and pump as near as may be required.

The gear-casing preferably consists of two parts of generally circular form, and of more or less cup-shape character, having their open ends facing each other, to form a housing for the gearing hereinafter described. Preferably, these sections, as stated, are of more or less circular form each being provided at its upper end with an upwardly tapering extension adapted to form a throat leading from the casing proper to the interior of a pump-cylinder —6—, and preferably the pump cylinder is of such a diameter as to fit the upper end of the throat —7— of the casing —3— and may be secured thereto in any suitable manner, as by bolts —8—.

The section —9— of this casing —3— is preferably provided with a pair of legs —10— and —11— which in conjunction with the leg —12— formed on the angle bar —4—, constitute a three point support for the apparatus. The section —13— is preferably provided with a downward extension —16— of somewhat semi-circular character, and this downward extension also projects somewhat laterally from the section —13— to form a recess within which the gear —14— is positioned. This gear —14— is mounted on a shaft —15— journaled in the casing, and is in mesh with the relatively small gear —17— mounted upon the armature shaft —18— of the motor, which shaft is journaled in the bearing —19— and at its end carries, as stated, the relatively small gear —17— which meshes with the gear —14— upon the shaft —15—. This shaft —15— also carries the relatively small gear —20— adapted to mesh with the large gear —21— which gear at an eccentric point thereon carries a sub-shaft —22— upon which the lower end of the piston rod —23— is journaled. This piston rod projects vertically, or substantially vertically, through the throat —7— and at its upper end carries the piston —24— which moves in the cylinder —6— for the purpose of producing vacuum in the valve chamber —25—.

By the gearing shown, the speed of the motor is transmitted to the piston rod —23— at a rate best suited for most efficient milking. This speed may vary somewhere between 42 and 50 R. P. M.

The upper end of the pump cylinder —6— is provided with a nipple —26— which may be connected to the nipple —27— of the valve chamber —25— in any suitable manner, as by the flexible tubing —28—. The construction and method of operation of the valve chamber —25— is generally similar to that of the structure of Re-issue Patent 13,876 dated February 9, 1915, except that the detachable head portion —29— is formed with a depending substantially cylindrical flange —30— surrounding the outlet communicating with the nipple —27— and of somewhat larger interior diameter than the nipple —27— and depending within the valve chamber a suitable distance for the purpose hereinafter described.

As shown, the flange —30— extends a short distance below the lower edge of the head section —29— but it will be understood that various changes and modifications may be made in this exact structure, and the particular size is not essential to the invention. Within this cylindrical flange —30— is arranged a float valve —31— which may be of any suitable material, such as rubber, adapted to close the opening —32— leading to nipple —27— when liquid fills the chamber —25— to a height sufficient to elevate the ball —31— into a position closing the opening —32—.

The object of this construction is to prevent milk being drawn through nipple —27— and into the pump, should the valve chamber at any time substantially fill with liquid. The float valve —31— may be supported within the cylindrical flange in any suitable manner as by the cross-bar, or wire —33— having its ends mounted in opposite sides of the flange —30— and preferably having its central portion bent downwardly somewhat to normally support the ball in the central portion of the chamber within the flange —30— to permit the free passage of air upwardly toward nipple —27— when the vacuum devices operate to draw air from the valve chamber —25— to produce vacuum therein, by means of which milk is drawn into the chamber through tangential nipple —34— connected in any suitable way as by flexible hose —35— with teat cups not shown. Discharge from the chamber is by automatic valve —60—.

It will be understood that although we have shown this particular construction as applied to the valve chamber of Reissue Patent 13,876, its application is general to valve chambers of this type, and we do not desire to limit ourselves to the particular construction of the valve chamber, except as set forth in detail in the claims hereto appended.

The piston —24— illustrated in enlarged section, Figures 5 and 6, is of somewhat peculiar and novel construction, particularly efficient for the purposes of operation in connection with the apparatus shown. This piston comprises a guide section —35— of substantially circular form, carrying a cross cylinder —36— loosely mounted therein for rotary and longitudinal movement, to which cross-cylinder the upper end of the piston rod —23— is rigidly secured. As illustrated, the piston rod may extend through the cylinder —36— and be pinned thereto in any suitable manner. The cylinder —36— being free to rotate and to move longitudinally, is limited only by the contact of the piston rod with the wall, or recess —61— which recess is considerably larger than the piston rod and permits longitudinal movement and rotary movement sufficient to permit proper angular disposition of the piston rod —23— with respect to the guide section —35— during rotation of the gear —21—.

The cup leather —37— is secured to the guide section —35— in a new and novel manner, in that it is mounted upon a bolt —38— which may, as shown, have a threaded relation with the section —35— and may be spaced a pre-determined distance therefrom by sleeve —39— cup leather —37—, washer —40— and plate —41—, cup-leather —37— being disposed between the plate —41— and the washer —40—, all of the parts so far described being rigidly held at their engaging portions by the bolt —38— and sleeve —39—.

Figure 2:
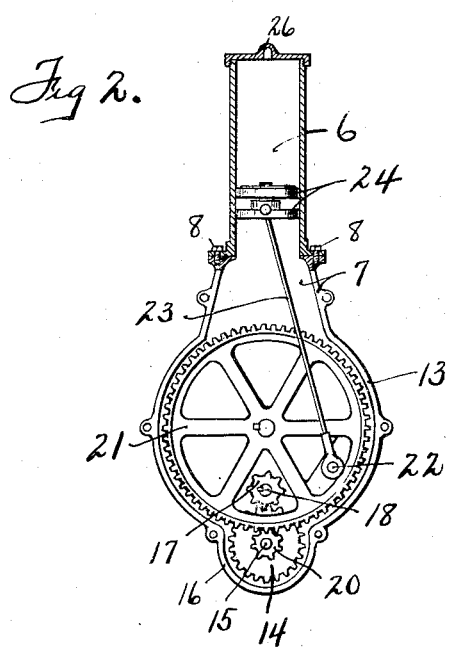
Figure 2 is a view partially in section of the gear casing and pump.
Figure 3:
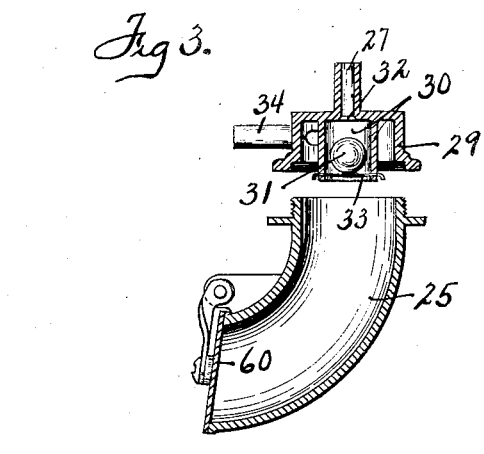
Figure 3 is a sectional view of the valve chamber.

For the purpose of resiliently supporting the outer portion of the cup-leather —37— in desired position, the supporting plate —42— is provided having at its outer edge a somewhat conically shaped flange —43— adapted to shape the outer edge of the cup-leather. This supporting plate —42— is mounted upon the sleeve —39— and is held in contact with the washer —40— by means of spring —44— positioned between the plate —42— and the upper surface of the guide-section —35—. Upon the upward movement of the piston in the construction shown in Figure 2, the section —42— is free to move rearwardly or downwardlly against the action of the spring —44—, so as to relieve the positive positioning of the outer surface of the cup-leather —37—, permitting the cup-leather to flex, or bend downwardly somewhat away from the plate —41—. The operation of this will be readily understood from the sections disclosed in Figures 5 and 6.

The two sections of the case —3— may be secured together in any suitable manner, as by bolt —45—.

The operation of the apparatus will be readily understood from the above descripton. The rotation of the armature shaft —18— drives the piston rod —23— through the gearing described thereby alternately producing and releasing the pressure in the valve chamber —25— to permit its automatic operation in a manner well known.

The apparatus above described is light and easily portable by a single individual. In the particular constructions heretofore made, an apparatus has been constructed which weighed in the neighborhood of 40 pounds, and has been found to be highly efficient in effecting the operation of milking. A relatively small motor may be used, and the particular apparatus referred to embodies a motor of about ⅛ H. P.

Although I have shown and described a specific construction and details of form and arrangement of the parts of the apparatus as constituting a perhaps preferred embodiment of my invention, I do not desire to limit myself to the details of construction, form or arrangement of the parts, as many and various changes may be made in each of the same without departing from the invention as set forth in the appended claims.

I claim:

1. An apparatus of the character described comprising a frame, a motor mounted within the frame, a gear casing connected to one end of the frame, gearing within the casing, said motor connected to drive said gearing, a pump cylinder, a piston movable within the cylinder, and a piston rod connected to the piston and driven by said gearing a vacuum chamber and means connecting the vacuum chamber to the pump cylinder.

2. An apparatus of the character described comprising a substantially horizontally-arranged U-shaped frame, with a leg projecting downwardly from the closed end of said frame, a vertically-arranged gear casing connected to the open end of said frame, a motor mounted on said frame, gearing within said casing driven by said motor, a pump cylinder and a piston arranged within the cylinder driven by said gearing a vacuum chamber and means connecting the vacuum chamber to the pump cylinder.

3. An apparatus of the character described comprising a gear casing having an opening through a wall thereof, an elongated cylinder connected to said gear casing with one of its ends in alignment with the opening in the gear casing, a piston in said cylinder, a piston rod connected to said piston and extending through the opening in the gear casing, gearing in said casing for driving said piston rod, a pipe in communication with the other end of the cylinder and a vacuum chamber in communication with said pipe.

4. An apparatus of the character described comprising a gear casing having an opening through a wall thereof, an elongated cylinder connected to said gear casing with one of its ends in alignment with the opening in the gear casing, a piston in said cylinder, a piston rod connected to said piston and extending through the opening in the gear casing, gearing in said casing for driving said piston rod, a vacuum chamber, means connecting the vacuum chamber to the said cylinder a U-shaped frame having its legs connected at their free ends to the gear casing, a motor mounted on said frame, and disposed within the frame, and driving connections between the motor and the gearing.

5. An apparatus of the character described comprising a frame, a motor mounted within the frame, a gear casing connected to the frame, gearing within the casing, a motor carried by the frame and connected to drive said gearing, a pump cylinder, a piston movable within the cylinder, a piston rod connected to the piston and driven by said gearing, a vacuum chamber, means connecting the vacuum chamber to the cylinder, and a float valve within the vacuum chamber and controlling the communication between the vacuum chamber and said cylinder.

In witness whereof I have hereunto set my hand this 24th day of March 1921.

RALPH L. HINMAN.

Witnesses:
 JESSIE E. ROGERS,
 W. LEE EATON.